US008030794B2

(12) United States Patent
Finnigan

(10) Patent No.: US 8,030,794 B2
(45) Date of Patent: Oct. 4, 2011

(54) DEVICE FOR CAPTURING ENERGY FROM A FLUID FLOW

(75) Inventor: Timothy Donegal Finnigan, Waverley (AU)

(73) Assignee: BioPower Systems Pty. Ltd., Mascot, New South Wales (AU)

( * ) Notice: Subject to any disclaimer, the term of this patent is extended or adjusted under 35 U.S.C. 154(b) by 370 days.

(21) Appl. No.: 12/063,567

(22) PCT Filed: Aug. 11, 2006

(86) PCT No.: PCT/AU2006/001148
§ 371 (c)(1),
(2), (4) Date: May 16, 2009

(87) PCT Pub. No.: WO2007/019607
PCT Pub. Date: Feb. 22, 2007

(65) Prior Publication Data
US 2010/0140933 A1    Jun. 10, 2010

(30) Foreign Application Priority Data

Aug. 12, 2005 (AU) .................. 2005904358
Jul. 26, 2006 (AU) .................. 2006904032

(51) Int. Cl.
*F03D 9/00* (2006.01)
(52) U.S. Cl. ................ 290/55; 290/43; 415/4.2
(58) Field of Classification Search .......... 290/43, 290/54–55; 416/9, 11, 17, 116; 415/4.2
See application file for complete search history.

(56) References Cited

U.S. PATENT DOCUMENTS

| 178,576 | A * | 6/1876 | Woester ..................... 416/9 |
| 4,470,770 | A | 9/1984 | Grose |
| 4,595,336 | A | 6/1986 | Grose |
| 6,652,232 | B2 | 11/2003 | Bolduc |
| 6,731,018 | B1 | 5/2004 | Grinsted et al. |
| 7,126,235 | B2 * | 10/2006 | Bernhoff et al. ............ 290/44 |
| 2002/0146321 | A1 | 10/2002 | Pollard, V |
| 2010/0156106 | A1 * | 6/2010 | Finnigan ..................... 290/53 |

FOREIGN PATENT DOCUMENTS

GB    2413785 A    11/2005
WO    87/04401 A1    7/1987

* cited by examiner

*Primary Examiner* — Michael Zarroli
(74) *Attorney, Agent, or Firm* — McDonnell Boehnen Hulbert & Berghoff LLP

(57) ABSTRACT

A device (10) for capturing energy from a fluid flow is disclosed. The device (10) comprises a base (12) adapted for stationary mounting relative to the fluid flow. A member (20), having a longitudinal axis (21), is movably connected relative to the base (12) and is adapted to move relative to the base (12) towards a position in which the longitudinal axis (21) generally aligns with a vertical plane parallel to the direction of the fluid flow passing the member (20). A lift generating element (26) is connected to the member (20) and is movable relative to the direction of the fluid flow to vary a direction of lift produced by the lift generating element (26) as fluid flows therearound. The lift generated by the lift generating element (26) drives the member (20) in oscillatory motion relative to the base (12). An energy transfer mechanism is attached to the member (20) and is adapted to be driven by the oscillation of the member (20).

33 Claims, 2 Drawing Sheets

DEVICE FOR CAPTURING ENERGY FROM A FLUID FLOW

FIELD OF THE INVENTION

The present invention relates generally to a device for capturing energy from a fluid flow and more particularly from tidal or marine currents or fast-flowing rivers.

The present invention has been developed primarily for use in hydro-electricity generation, and will be described hereinafter with reference to this application. However, it will be appreciated that the invention is not limited to this particular application and can also be used to generate electricity from wind. Also, instead of generating electricity, the device may be fitted with a reciprocating pump to create a source of high pressure water for desalination or may be adapted for driving other external devices.

BACKGROUND OF THE INVENTION

U.S. Pat. No. 6,731,018 discloses a device for capturing energy from tidal flows and river currents. This device includes a column fixedly mounted to the sea floor and a buoyant open bottomed tank slidably mounted on the column. Several hydrofoils are hingedly connected to the sides of the tank, each rotatable about a horizontal axis. The tank is driven in oscillatory vertical motion along the column by varying the angle of inclination of the hydrofoils with respect to the direction of water flow past the device. As the tank oscillates, the pressure of air within the tank varies. Ducts are provided in the tank and house high speed turbines for generating power in response to air flow generated by the changing pressure within the tank.

A disadvantage of the device disclosed in U.S. Pat. No. 6,731,018 is that it can not realign with changing directions of water flow. Another disadvantage of the device disclosed in U.S. Pat. No. 6,731,018 is that it inefficiently captures energy from the water flow, due to the required movement of a large tank against the resistance of the water. Another disadvantage of the device disclosed in U.S. Pat. No. 6,731,018 is that energy from the flow is transferred to the generators in an indirect manner, having to pass through multiple intermediate stages (water to hydrofoils, hydrofoils to tank motion, tank motion to air compression, air compression to flow across turbine), which together reduce the overall efficiency. Another disadvantage of the device disclosed in U.S. Pat. No. 6,731,018 is that the hydrofoils do not make optimal use of the fluid force imparted to them. A further disadvantage of the U.S. Pat. No. 6,731,018 device is that the hydrofoil shapes disclosed are not generally efficient in unsteady oscillating flows.

Further, the magnitude of tidal and marine flows vary depending on prevailing conditions and the stage in the tidal cycle. The flows can be very low in some situations and extremely high in others. A disadvantage of the device disclosed in U.S. Pat. No. 6,731,018 is that it inefficiently responds to changing magnitudes of water flow due to its inability to broadly vary its motions, as a result of its fixed alignment. The only adjustment that can be made to the U.S. Pat. No. 6,731,018 device is the hydrofoil angle. Accordingly, the range of conditions across which the U.S. Pat. No. 6,731,018 device may be operated effectively is quite restricted.

OBJECT OF THE INVENTION

It is the object of the present invention to substantially overcome or at least ameliorate one or more of the above disadvantages.

SUMMARY OF THE INVENTION

Accordingly, in a first aspect, the present invention provides a device for capturing energy from a fluid flow, said device comprising:
   a base adapted for stationary mounting relative to said fluid flow;
   a member, having a longitudinal axis, movably connected relative to said base and adapted to move relative to said base towards a position in which said longitudinal axis generally aligns with a vertical plane parallel to the direction of the fluid flow passing the member;
   a lift generating element connected to said member and movable relative to the direction of the fluid flow to vary a direction of lift produced by said lift generating element as fluid flows therearound to thereby drive said member in oscillatory motion relative to said base; and
   an energy transfer mechanism attached to said member and adapted to be driven by the oscillation of said member.

Preferably, said member is adapted to move in response to the fluid flow towards said position in which said longitudinal axis generally aligns with said vertical plane. The member is preferably pivotally mounted to said base about a first pivotal axis. In a preferred form, said member is pivotable through at least 180 degrees, and more preferably 360 degrees, about said first pivotal axis. Preferably, the first pivotal axis is generally vertical. The longitudinal axis of the member is preferably substantially horizontal. In a preferred form, the member is streamlined.

Preferably, said fluid is water and said lift generating element is a hydrofoil. The hydrofoil is preferably pivotally connected to said member about a second pivotal axis. The second pivotal axis is preferably vertical and the hydrofoil is preferably adapted to generate a generally horizontal lift. More preferably, a surface of the hydrofoil extending between its leading and trailing edges is generally lunate shaped. The hydrofoil is preferably formed from a composite material. At least some portions of the hydrofoil are preferably adapted to flex in response to fluid forces. More preferably, the portions adapted to flex are upper and/or lower portions of the hydrofoil.

Alternatively, said fluid is air and said lift generating element is an aerofoil. The aerofoil is preferably pivotally connected to said member about a second pivotal axis. The second pivotal axis is preferably vertical and the aerofoil is preferably adapted to generate a generally horizontal lift. More preferably, a surface of the aerofoil extending between its leading and trailing edges is generally lunate shaped. The aerofoil is preferably formed from a composite material. At least some portions of the aerofoil are preferably adapted to flex in response to fluid forces. More preferably, the portions adapted to flex are upper and/or lower portions of the aerofoil.

Preferably, an actuator extends between the member and the lift generating element for moving the lift generating element relative to the direction of the fluid flow. The actuator is preferably driven by a torque motor. More preferably, a sensor is provided for measuring at least one fluid flow parameter. A controller is preferably responsive to said sensor for controlling movement of said lift generating element based on an output of said sensor. The controller preferably controls the movement of said lift generating element in real-time.

Preferably, the controller is adapted to control movement of the lift generating element into a position closer to parallel to said vertical plane if the value sensed by the sensor is indicative of fluid forces that may damage the device. Depending on the value indicated by the sensor, the lift generating element may be moved into and maintained in a streamlined configuration substantially parallel with said plane.

The controller is also preferably adapted to control movement of the lift generating element relative to the direction of the fluid flow to increase production of oscillatory energy by the member if the value indicated by the sensor is not indicative of fluid forces that may damage the device.

The base preferably includes a generally vertical column. In a preferred form, the column is generally cylindrical. The base preferably includes a circular mounting flange, fixedly connected to the column, for attachment to the ground by a plurality of anchors.

Preferably, a machine is connected to said energy transfer mechanism and is adapted to be driven thereby. The machine can preferably function both as a motor and as a generator. More preferably, said machine incorporates a synchronous permanent magnet motor/generator. In a preferred form, a stator of said motor/generator is fixedly connected to said base at an underside of said motor/generator. A rotor of said motor/generator is preferably held concentric to said stator by a bearing mounted at an upper side of said motor/generator. The motor/generator is preferably completely sealed and may be filled with inert gas under pressure to prevent internal corrosion or leaking. In some embodiments, the motor/generator can be supplied with external electrical power to drive the member relative to the base or to hold the member in a fixed position, against the action of fluid forces. Alternatively, said machine is a pump driven by the oscillatory motion of the energy transfer mechanism.

In a second aspect, the present invention provides a device for capturing energy from a fluid flow, said device comprising:
- a base adapted for stationary mounting relative to said fluid flow;
- a member, having a longitudinal axis, movably connected relative to said base;
- a lift generating element, connected to said member, having a leading edge and a trailing edge and a generally lunate surface extending therebetween, said lift generating element being movable relative to the direction of the fluid flow to vary a direction of lift produced by said lift generating element as fluid flows therearound to thereby drive said member in oscillatory motion relative to said base; and
- an energy transfer mechanism attached to said member and adapted to be driven by the oscillation of said member.

Preferably, said member is adapted to move relative to said base towards a position in which said longitudinal axis generally aligns with a vertical plane parallel to the direction of the fluid flow passing the member. Preferably also, said member is adapted to move in response to the fluid flow towards said position in which said longitudinal axis generally aligns with said vertical plane. The member is preferably pivotally mounted to said base about a first pivotal axis. In a preferred form, said member is pivotable through at least 180 degrees, and more preferably 360 degrees, about said first pivotal axis. Preferably, the first pivotal axis is generally vertical. The longitudinal axis of the member is preferably substantially horizontal. In a preferred form, the member is streamlined.

Preferably, said fluid is water and said lift generating element is a hydrofoil. The hydrofoil is preferably pivotally connected to said member about a second pivotal axis. More preferably, said second pivotal axis is generally vertical and the hydrofoil is preferably adapted to generate a generally horizontal lift. The hydrofoil is preferably formed from a composite material. At least some portions of the hydrofoil are preferably adapted to flex in response to fluid forces. More preferably, the portions adapted to flex are upper and/or lower portions of the hydrofoil.

Preferably, said fluid is air and said lift generating element is an aerofoil. The aerofoil is preferably pivotally connected to said member about a second pivotal axis. More preferably, said second pivotal axis is generally vertical and the aerofoil is preferably adapted to generate a generally horizontal lift. The aerofoil is preferably formed from a composite material. At least some portions of the aerofoil are preferably adapted to flex in response to fluid forces. More preferably, the portions adapted to flex are upper and/or lower portions of the aerofoil.

Preferably, an actuator extends between the member and the lift generating element for moving the lift generating element relative to the direction of the fluid flow. The actuator is preferably driven by a torque motor. More preferably, a sensor is provided for measuring at least one fluid flow parameter. A controller is preferably responsive to said sensor for controlling movement of said lift generating element based on an output of said sensor. The controller preferably controls the movement of said lift generating element in real-time.

Preferably, the controller is adapted to control movement of the lift generating element into a position closer to parallel to a vertical plane, which plane is parallel to the direction of the fluid flow passing the member, if the value sensed by the sensor is indicative of fluid forces that may damage the device. Depending on the value indicated by the sensor, the lift generating element may be moved into and maintained in a streamlined configuration substantially parallel with said plane.

The controller is also preferably adapted to control movement of the lift generating element relative to the direction of the fluid flow to increase production of oscillatory energy by the member if the value indicated by the sensor is not indicative of fluid forces that may damage the device.

The base preferably includes a generally vertical column. In a preferred form, the column is generally cylindrical. The base preferably includes a circular mounting flange, fixedly connected to said column, for attachment to the ground by a plurality of anchors.

A machine is preferably connected to said energy transfer mechanism and is adapted to be driven thereby. Preferably, said machine can function both as a motor and as a generator. More preferably, said machine incorporates a synchronous permanent magnet motor/generator. In a preferred form, a stator of said motor/generator is fixedly connected to said base at an underside of said motor/generator. A rotor of said motor/generator is preferably held concentric to said stator by a bearing mounted at an upper side of said motor/generator. The motor/generator is preferably completely sealed and may be filled with inert gas under pressure to prevent internal corrosion or leaking. In some embodiments, the motor/generator can be supplied with external electrical power to drive the member relative to the base or to hold the member in a fixed position, against the action of fluid forces.

Alternatively, said machine is a pump driven by the oscillatory motion of the energy transfer mechanism.

In a third aspect, the present invention provides a device for capturing energy from a fluid flow, said device comprising:
- a base adapted for stationary mounting relative to said fluid flow;
- a member, having a longitudinal axis, movably connected relative to said base;
- a lift generating element, connected to said member, said lift generating element being movable relative to the direction of the fluid flow to vary a direction of lift produced by said lift generating element as fluid flows therearound to thereby drive said member in oscillatory motion relative to said base;

a sensor for sensing a value indicative of at least one fluid flow parameter;

a controller for controlling the movement of the lift generating element relative to the direction of the fluid flow, based on the value sensed by said sensor; and an energy transfer mechanism attached to said member and adapted to be driven by the oscillation of said member.

Preferably, the controller is adapted to control movement of the lift generating element into a position closer to parallel to a vertical plane, which plane is parallel to the direction of the fluid flow passing the member, if the value sensed by the sensor is indicative of fluid forces that may damage the device. Depending on the value indicated by the sensor, the lift generating element may be moved into and maintained in a streamlined configuration substantially parallel with said plane.

The controller is also preferably adapted to control movement of the lift generating element relative to the direction of the fluid flow to increase production of oscillatory energy by the member if the value indicated by the sensor is not indicative of fluid forces that may damage the device.

Preferably, an actuator extends between the member and the lift generating element for moving the lift generating element relative to the direction of the fluid flow. The actuator is preferably driven by a torque motor that is controlled by the controller.

Preferably, said member is adapted to move relative to said base towards a position in which said longitudinal axis generally aligns with a vertical plane parallel to the direction of the fluid flow passing the member. Preferably also, said member is adapted to move in response to the fluid flow towards said position in which said longitudinal axis generally aligns with said vertical plane. The member is preferably pivotally mounted to said base about a first pivotal axis. In a preferred form, said member is pivotable through at least 180 degrees, and more preferably 360 degrees, about said first pivotal axis. Preferably, the first pivotal axis is generally vertical. The longitudinal axis of the member is preferably substantially horizontal. In a preferred form, the member is streamlined.

Preferably, said fluid is water and said lift generating element is a hydrofoil. The hydrofoil is preferably pivotally connected to said member about a second pivotal axis. The second pivotal axis is preferably vertical and the hydrofoil is preferably adapted to generate a generally horizontal lift. More preferably, a surface of the hydrofoil extending between its leading and trailing edges is generally lunate shaped. The hydrofoil is preferably formed from a composite material. At least some portions of the hydrofoil are preferably adapted to flex in response to fluid forces. More preferably, the portions adapted to flex are upper and/or lower portions of the hydrofoil.

Preferably, said fluid is air and said lift generating element is an aerofoil. The aerofoil is preferably pivotally connected to said member about a second pivotal axis. The second pivotal axis is preferably vertical and the aerofoil is preferably adapted to generate a generally horizontal lift. More preferably, a surface of the aerofoil extending between its leading and trailing edges is generally lunate shaped. The aerofoil is preferably formed from a composite material. At least some portions of the aerofoil are preferably adapted to flex in response to fluid forces. More preferably, the portions adapted to flex are upper and/or lower portions of the aerofoil.

The base preferably includes a generally vertical column. In a preferred form, the column is generally cylindrical. The base preferably includes a circular mounting flange, fixedly connected to said column, for attachment to the ground by a plurality of anchors.

Preferably, a machine is connected to said energy transfer mechanism and is adapted to be driven thereby. The machine can preferably function both as a motor and as a generator. More preferably, said machine incorporates a synchronous permanent magnet motor/generator. In a preferred form, a stator of said motor/generator is fixedly connected to said base at an underside of said motor/generator. A rotor of said motor/generator is preferably held concentric to said stator by a bearing mounted at an upper side of said motor/generator. The motor/generator is preferably completely sealed and may be filled with inert gas under pressure to prevent internal corrosion or leaking. In some embodiments, the motor/generator can be supplied with external electrical power to drive the member relative to the base or to hold the member in a fixed position, against the action of fluid forces.

Alternatively, said machine is a pump driven by the oscillatory motion of the energy transfer mechanism.

In a fourth aspect, the invention provides a device for capturing energy from a fluid flow, said device comprising:

a base adapted for stationary mounting relative to said fluid flow;

a member, having a longitudinal axis, movably connected relative to said base and adapted to move relative to said base towards a position in which said longitudinal axis generally aligns with a vertical plane parallel to the direction of the fluid flow passing the member;

a lift generating element, connected to said member, having a leading edge and a trailing edge and a generally lunate surface extending therebetween, said lift generating element being movable relative to the direction of the fluid flow to vary a direction of lift produced by said lift generating element as fluid flows therearound to thereby drive said member in oscillatory motion relative to said base; and an energy transfer mechanism attached to said member and adapted to be driven by the oscillation of said member.

In a fifth aspect, the invention provides a device for capturing energy from a fluid flow, said device comprising:

a base adapted for stationary mounting relative to said fluid flow;

a member, having a longitudinal axis, movably connected relative to said base and adapted to move relative to said base towards a position in which said longitudinal axis generally aligns with a vertical plane parallel to the direction of the fluid flow passing the member;

a lift generating element connected to said member and movable relative to the direction of the fluid flow to vary a direction of lift produced by said lift generating element as fluid flows therearound to thereby drive said member in oscillatory motion relative to said base;

a sensor for sensing a value indicative of at least one fluid flow parameter;

a controller for controlling the movement of the lift generating element relative to the direction of the fluid flow, based on the value sensed by said sensor; and an energy transfer mechanism attached to said member and adapted to be driven by the oscillation of said member.

In a sixth aspect, the invention provides a device for capturing energy from a fluid flow, said device comprising:

a base adapted for stationary mounting relative to said fluid flow;

a member, having a longitudinal axis, movably connected relative to said base;

a lift generating element, connected to said member, having a leading edge and a trailing edge and a generally lunate surface extending therebetween, said lift generating element being movable relative to the direction of the fluid flow to vary a direction of lift produced by said lift generating element as fluid flows therearound to thereby drive said member in oscillatory motion relative to said base;

a sensor for sensing a value indicative of at least one fluid flow parameter;

a controller for controlling the movement of the lift generating element relative to the direction of the fluid flow, based on the value sensed by said sensor; and an energy transfer mechanism attached to said member and adapted to be driven by the oscillation of said member.

In a seventh aspect, the invention provides a device for capturing energy from a fluid flow, said device comprising:

a base adapted for stationary mounting relative to said fluid flow;

a member, having a longitudinal axis, movably connected relative to said base and adapted to move relative to said base towards a position in which said longitudinal axis generally aligns with a vertical plane parallel to the direction of the fluid flow passing the member;

a lift generating element, connected to said member, having a leading edge and a trailing edge and a generally lunate surface extending therebetween, said lift generating element being movable relative to the direction of the fluid flow to vary a direction of lift produced by said lift generating element as fluid flows therearound to thereby drive said member in oscillatory motion relative to said base;

a sensor for sensing a value indicative of at least one fluid flow parameter;

a controller for controlling the movement of the lift generating element relative to the direction of the fluid flow, based on the value sensed by said sensor; and an energy transfer mechanism attached to said member and adapted to be driven by the oscillation of said member.

BRIEF DESCRIPTION OF THE DRAWINGS

A preferred embodiment of the present invention will now be described, by way of an example only, with reference to the accompanying drawings, wherein.

DETAILED DESCRIPTION OF THE PREFERRED EMBODIMENTS

Figure 1:
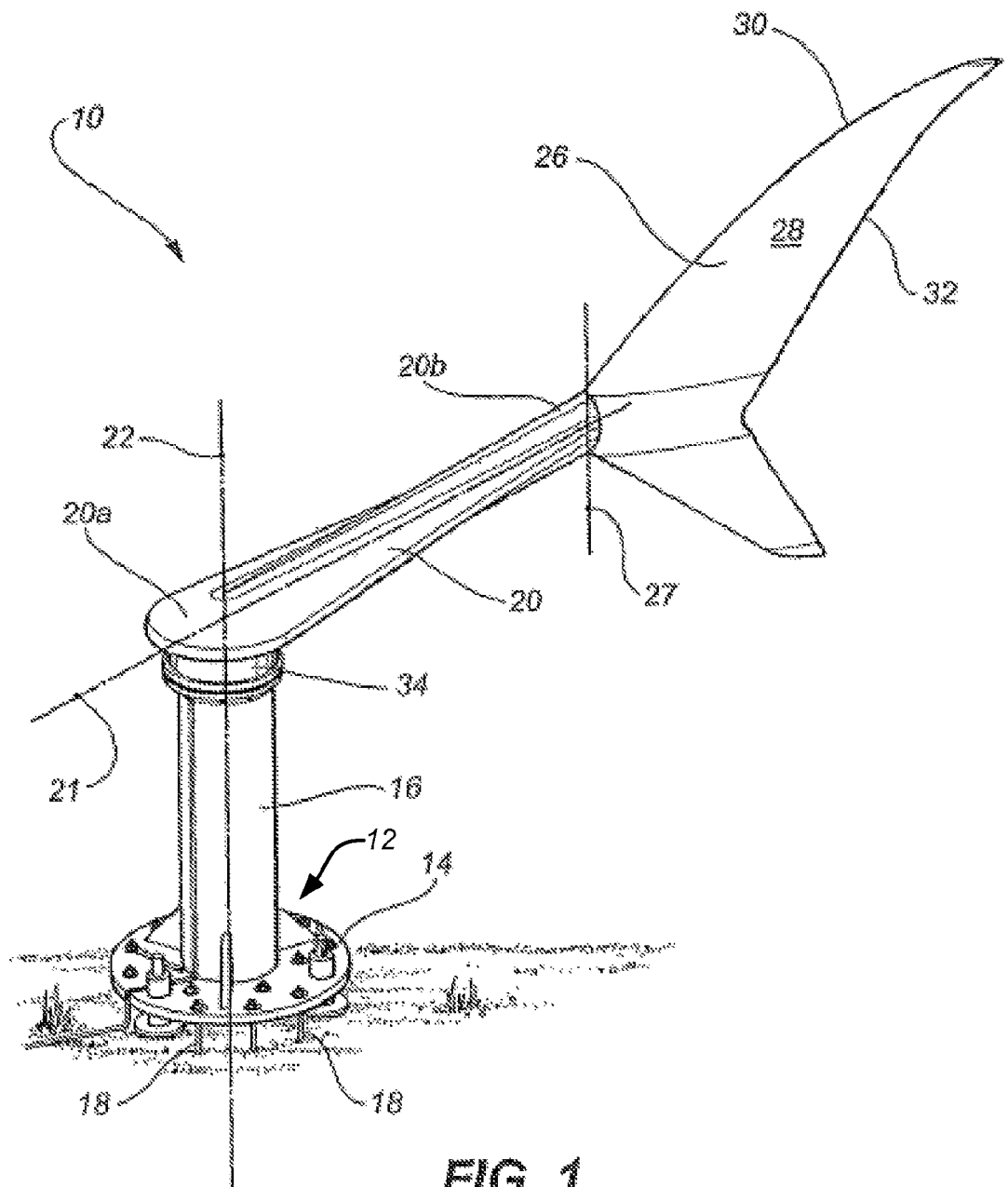
FIG. 1 is a schematic perspective view of an embodiment of a device for capturing energy from a water flow.

FIG. 1 shows an embodiment of a device 10 for capturing energy from a water flow, such as a tidal or marine flow or fast-flowing river. The device 10 comprises a base 12 including a generally circular mounting flange 14 and a cylindrical column 16 fixedly connected to and extending generally perpendicularly from the flange 14. The mounting flange 14 is adapted for stationary mounting relative to the water flow by a plurality of anchor bolts 18.

The base 12 forms part of a mooring for anchoring the device 10 relative to the water flow. The mooring is disclosed in detail in the Applicant's earlier filed Australian Provisional Patent Application No. 2006904030 and the co-pending international patent application claiming Convention priority therefrom, the disclosures of which are incorporated herein by reference.

Figure 2:
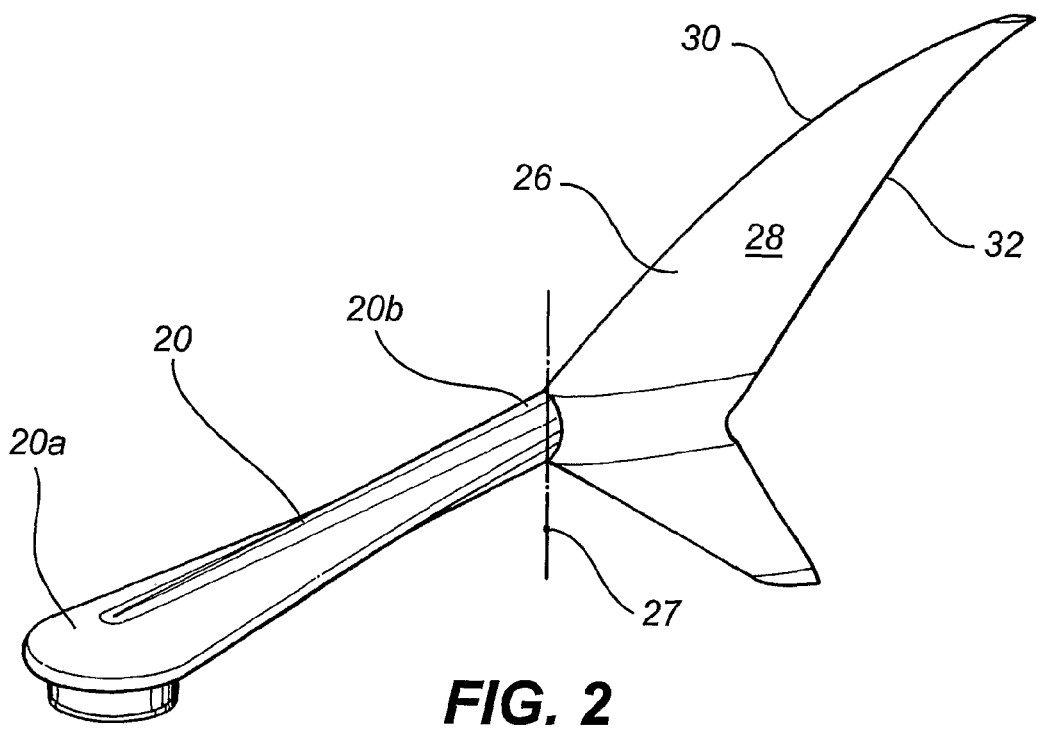
FIG. 2 is a schematic perspective view of the member and hydrofoil of the device of FIG. 1.

As shown in FIGS. 1 and 2, a streamlined oscillatible member 20, having a longitudinal axis 21, is pivotally connected, about a generally vertical pivotal axis 22, to the column 16, at end 20a. The member 20 is adapted to move relative to the base 12, in response to the water flow, towards a position in which the longitudinal axis 21 generally aligns with a vertical plane parallel to the direction of the water flow and passing the member 20. The member 20 is able to freely pivot around the base 12, through 360 degrees, in response to changes in the direction of water flow. An energy transfer mechanism, in the form of an output shaft (not shown), is connected to the member 20 and is adapted to be driven by oscillation thereof.

Again referring to FIGS. 1 and 2, a lift generating element, in the form of a hydrofoil 26, is pivotally connected to the member 20, at its other end 20b, about a generally vertical pivotal axis 27, so as to produce a generally horizontal lift force. The hydrofoil 26 is pivotally movable, about the pivotal axis 27, relative to the direction of the water flow, to vary a direction of lift produced by the hydrofoil 26 as water flows therearound to thereby drive the member 20 in oscillatory motion, about the pivotal axis 22, relative to said base 12. The hydrofoil 26 has a generally lunate shaped surface 28 extending between its leading 30 and trailing 32 edges.

Figure 3:
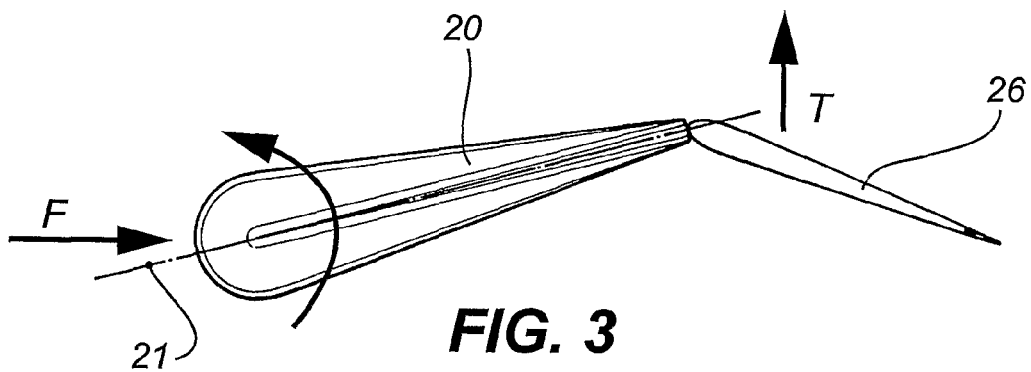
FIG. 3 is a schematic plan view of the device of FIG. 1, shown with the hydrofoil in a position for anti-clockwise movement of the member.
Figure 4:
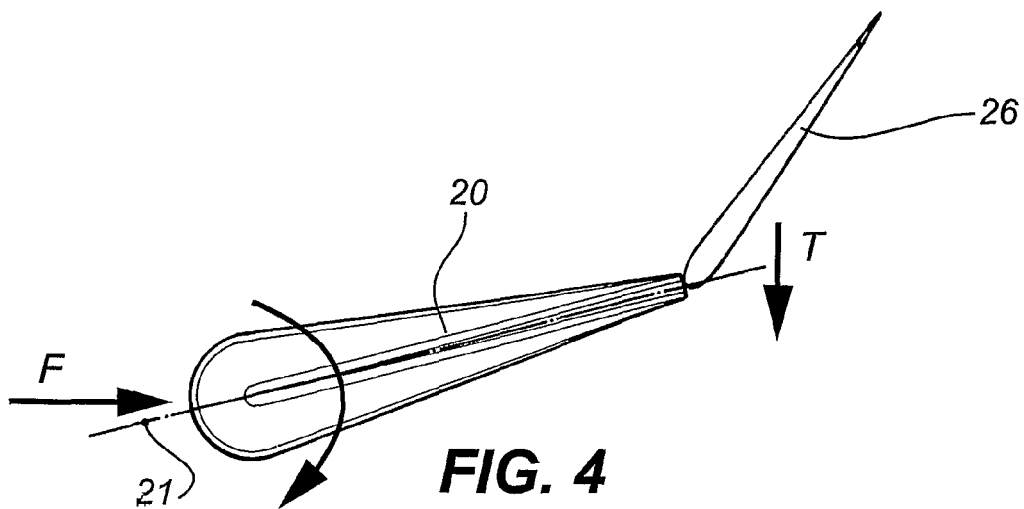
FIG. 4 is a schematic plan view of the device of FIG. 1, shown with the hydrofoil in a position for clockwise movement of the member.

As shown in FIGS. 3 and 4, horizontal cross-sections through the hydrofoil 26 are generally bi-convex in shape. The hydrofoil 26 is formed from a composite material and has upper and lower portions 33 that are adapted to flex in response to water forces. These flexible portions are formed from a resilient material, such as rubber.

An electro-pneumatic actuator (not shown), extends between the member 20 and the hydrofoil 26 and is driven by a torque motor (not shown) to move the hydrofoil 26 relative to the member 20 and relative to the direction of water flow F. With the hydrofoil 26 in the position shown in FIG. 3, the lift T produced by water flowing around the hydrofoil 26 moves the member 20 in an anti-clockwise direction about pivotal axis 22. With the hydrofoil 26 in the position shown in FIG. 4, the lift T produced by water flowing around the hydrofoil moves the member in a clockwise direction about pivotal axis 22.

A sensor (not shown) is provided for measuring water flow parameters, including the speed and direction of the water flow F. A controller (not shown) is responsive to the sensor for controlling movement of the hydrofoil 26, in real-time, based on an output of the sensor. The controller controls the application of external power to the actuator (not shown) via the torque motor (not shown) to continuously reorient the hydrofoil 26 relative to the direction of water flow F for maximising production of oscillatory energy by the member 20, provided that the output of the sensor is not indicative of water forces that may damage the device 10.

However, if the value sensed by the sensor is indicative of water forces that may damage the device 10, the controller is adapted to control the application of external power to the actuator (not shown) via the torque motor to move the hydrofoil 26 into a position closer to parallel to a vertical plane, which is parallel to the direction of the water flow F and passes the member 20, to reduce water forces on the device 10. Depending on the value indicated by the sensor, the hydrofoil 26 may be moved into and maintained in a streamlined configuration substantially parallel with this vertical plane.

Referring to FIG. 1, a machine for extracting energy, in the form of a synchronous permanent magnet motor/generator 34, is driven by oscillatory motion of the output shaft (not shown), which is driven by the member 20. The motor/generator 34 is mounted to the output shaft at the top of the column 16. A stator of the motor/generator 34 is fixedly connected to the column 16 at an underside of the motor/generator 34. A rotor of the motor/generator 34 is held concentric to the stator by a bearing (not shown) mounted at an upper side of the motor/generator 34. The motor/generator 34 is completely sealed and filled with inert gas under pressure to prevent internal corrosion or leaking. If required, the motor/generator 34 can be supplied with external electrical power, under control of the controller, to hold the member 20 in a fixed position, against the action of water forces.

In use, the oscillatory motion of the member 20, and of the output shaft (not shown), drives the motor/generator 34 to produce hydro-electricity, which is supplied to a distribution grid (not shown).

It will be appreciated that the member 20 can advantageously align with changing directions of water flow. Also, the provision of the sensor, controller and motor advantageously allow the hydrofoil 26 to be continuously reoriented to provide optimum energy capturing efficiency and to prevent damage to the device 10. The generally lunate shape of the hydrofoil 26 also provides increased performance by reducing the occurrence of flow separation and attendant loss of lift producing force at large hydrofoil angles relative to the direction of the fluid flow, as well as in high flows. Also, by mounting the hydrofoil 26 on the end of the elongate member 20, the moment of inertia generated by the hydrofoil 26 is increased, which correspondingly increases the oscillating energy imparted to the output shaft (not shown).

While the present invention has been described with reference to a specific embodiment, it will be appreciated that it may also be embodied in many other forms. For example:

The hydrofoil 26 may be pivotally connected to the member 20 about a generally horizontal axis and may drive the member 20 in oscillatory motion about a generally horizontal axis;

The motor/generator 34 can be replaced by a pump driven by oscillatory motion of the member to produce a source of high pressure water for desalination or for driving other external devices;

The member 20 can be connected to a plurality of hydrofoils;

The member 20 can pivot through only 180 degrees about the axis 22; and/or

The device 10 can be placed in an air flow, such that the lift generating element 26 becomes an aerofoil, for generating electricity therefrom.

The invention claimed is:

1. A device for capturing energy from a fluid flow without the use of rotor blades, said device comprising: a base adapted for stationary mounting relative to said fluid flow; a member, having a longitudinal axis, movably connected relative to said base; a lift generating element, connected to said member, having a leading edge and a trailing edge and a generally crescent surface extending therebetween, said lift generating element being movable relative to the direction of the fluid flow to vary a direction of lift produced by said lift generating element as fluid flows therearound to thereby drive said member in oscillatory motion relative to said base; and an energy transfer mechanism attached to said member and adapted to be driven by the oscillation of said member.

2. A device according to claim 1, wherein said member is adapted to move relative to said base towards a position in which said longitudinal axis generally aligns with a vertical plane parallel to the direction of the fluid flow passing the member.

3. A device according to claim 2, wherein said member is adapted to move in response to the fluid flow towards said position in which said longitudinal axis generally aligns with said vertical plane.

4. A device according to claim 1, wherein said member is pivotally mounted to said base about a first pivotal axis.

5. A device according to claim 4, wherein said member is pivotable through 360 degrees about said first pivotal axis.

6. A device according to claim 4, wherein said first pivotal axis is generally vertical.

7. A device according to claim 1, wherein the longitudinal axis of said member is substantially horizontal.

8. A device according to claim 1, wherein said member is streamlined.

9. A device according to claim 1, wherein said fluid is water and said lift generating element is a hydrofoil.

10. A device according to claim 9, wherein said hydrofoil is pivotally connected to said member about a second pivotal axis.

11. A device according to claim 10, wherein said second pivotal axis is substantially vertical and the hydrofoil is adapted to generate a substantially horizontal lift.

12. A device according to claim 9, wherein said hydrofoil is formed from a composite material.

13. A device according to claim 9, wherein at least some portions of the hydrofoil are adapted to flex in response to water forces.

14. A device according to claim 13, wherein the portions adapted to flex are upper and/or lower portions of the hydrofoil.

15. A device according to claim 1, wherein said fluid is air and said lift generating element is an aerofoil.

16. A device according to claim 15, wherein said aerofoil is pivotally connected to said member about a second pivotal axis.

17. A device according to claim 16, wherein said second pivotal axis is substantially vertical and the aerofoil is adapted to generate a substantially horizontal lift.

18. A device according to claim 15, wherein said aerofoil is formed from a composite material.

19. A device according to claim 15, wherein at least some portions of the aerofoil are adapted to flex in response to air forces.

20. A device according to claim 19, wherein the portions adapted to flex are upper and/or lower portions of the aerofoil.

21. A device according to claim 1, further comprising an actuator extending between said member and said lift generating element for moving said lift generating element relative to the direction of the fluid flow.

22. A device according to claim 1, further comprising a sensor for measuring at least one fluid flow parameter.

23. A device according to claim 22, further comprising a controller responsive to said sensor for controlling movement of said lift generating element based on an output of said sensor.

24. A device according to claim 23, wherein said controller is adapted to control movement of said lift generating element in real-time.

25. A device according to claim 23, wherein said controller is adapted to control movement of said lift generating element into a position closer to parallel to a vertical plane, which plane is parallel to the direction of the fluid flow passing said member, if the value sensed by said sensor is indicative of fluid forces that may damage the device.

26. A device according to claim 23, wherein if the fluid flow force indicated by the sensor is greater than a predetermined magnitude, the controller controls movement of said lift generating element into a streamlined configuration substantially parallel with said vertical plane.

27. A device according to claim 23, wherein the controller is adapted to control movement of said lift generating element relative to the direction of the fluid flow to increase production of oscillatory energy by said member if the value indicated by the sensor is not indicative of fluid forces that may damage the device.

28. A device according to claim 1, wherein the base includes a generally vertical column.

29. A device according to claim 28, wherein the column is generally cylindrical.

30. A device according to claim 28, wherein the base includes a circular mounting flange, fixedly connected to said column, for attachment to the a stationary body by a plurality of anchors.

31. A device according to claim 1, further comprising a machine connected to said energy transfer mechanism and adapted to be driven thereby.

32. A device according to claim 31, wherein said machine is adapted to function both as a motor and as a generator.

33. A device according to claim 31, wherein said machine is a pump driven by the oscillatory motion of the energy transfer mechanism.

* * * * *